United States Patent [19]

Mutter

[11] Patent Number: 5,361,796
[45] Date of Patent: Nov. 8, 1994

[54] INSTALLATION FOR REFUELLING A MOBILE PRESSURE VESSEL WITH A GASEOUS FUEL AND A METHOD OF OPERATION OF AN INSTALLATION OF THAT KIND

[75] Inventor: Heinz Mutter, Winterthur, Switzerland

[73] Assignee: Maschinenfabrik Sulzer Burckhardt AG, Basel, Switzerland

[21] Appl. No.: 165,225

[22] Filed: Dec. 10, 1993

[30] Foreign Application Priority Data

Jan. 22, 1993 [EP] European Pat. Off. ........ 93810045.0

[51] Int. Cl.⁵ ............................................. F16K 11/02
[52] U.S. Cl. ...................................... 137/14; 137/255; 137/625.11; 222/6
[58] Field of Search ............ 137/14, 255, 256, 625.11; 222/6

[56] References Cited

U.S. PATENT DOCUMENTS

| | | |
|---|---|---|
| 3,719,196 | 3/1973 | McJones . |
| 3,837,360 | 9/1974 | Bubula ................ 137/625.11 X |
| 3,847,173 | 11/1974 | Hill ................... 137/256 X |
| 4,156,437 | 5/1979 | Chivens . |

OTHER PUBLICATIONS

Anthony J. Zwemmer, "Factors influencing the use of CNG as an automotive fuel", 1986, Sulzer Burckhardt, Basel, Switzerland.

*Primary Examiner*—Robert G. Nilson
*Attorney, Agent, or Firm*—Townsend and Townsend Khourie and Crew

[57] ABSTRACT

A refuelling equipment (7) may be connected via an adjustable loading valve (30) to three groups of intermediate stores (4, 5, 6) in which natural gas is stored at different storage pressures. The loading valve (30) contains three inlets, each of which is connected via a feedline (13a, 14a or 15a respectively) to one of the intermediate stores (4, 5 or 6 respectively), and one outlet which is connected via an outlet line (24) to the refuelling equipment (7). The loading valve (30) further contains a cyclically adjustable valve body (31) which may be switched respectively from a first blocking position blocking all of the inlets, into a first flow position connecting the supply line (13a) to the outlet line (24), past a second blocking position into a second flow position connecting the supply line (14a) to the outlet line (24) and past a third blocking position into a third flow position connecting the supply line (15a) to the outlet line (24) and finally in the same direction of rotation back into the first blocking position. During each refuelling process the refuelling equipment (7) is accordingly directly connected first to the intermediate store at the lowest storage pressure, then to the intermediate store (5) at the middle storage pressure and finally to the intermediate store (6) at the highest storage pressure.

9 Claims, 3 Drawing Sheets

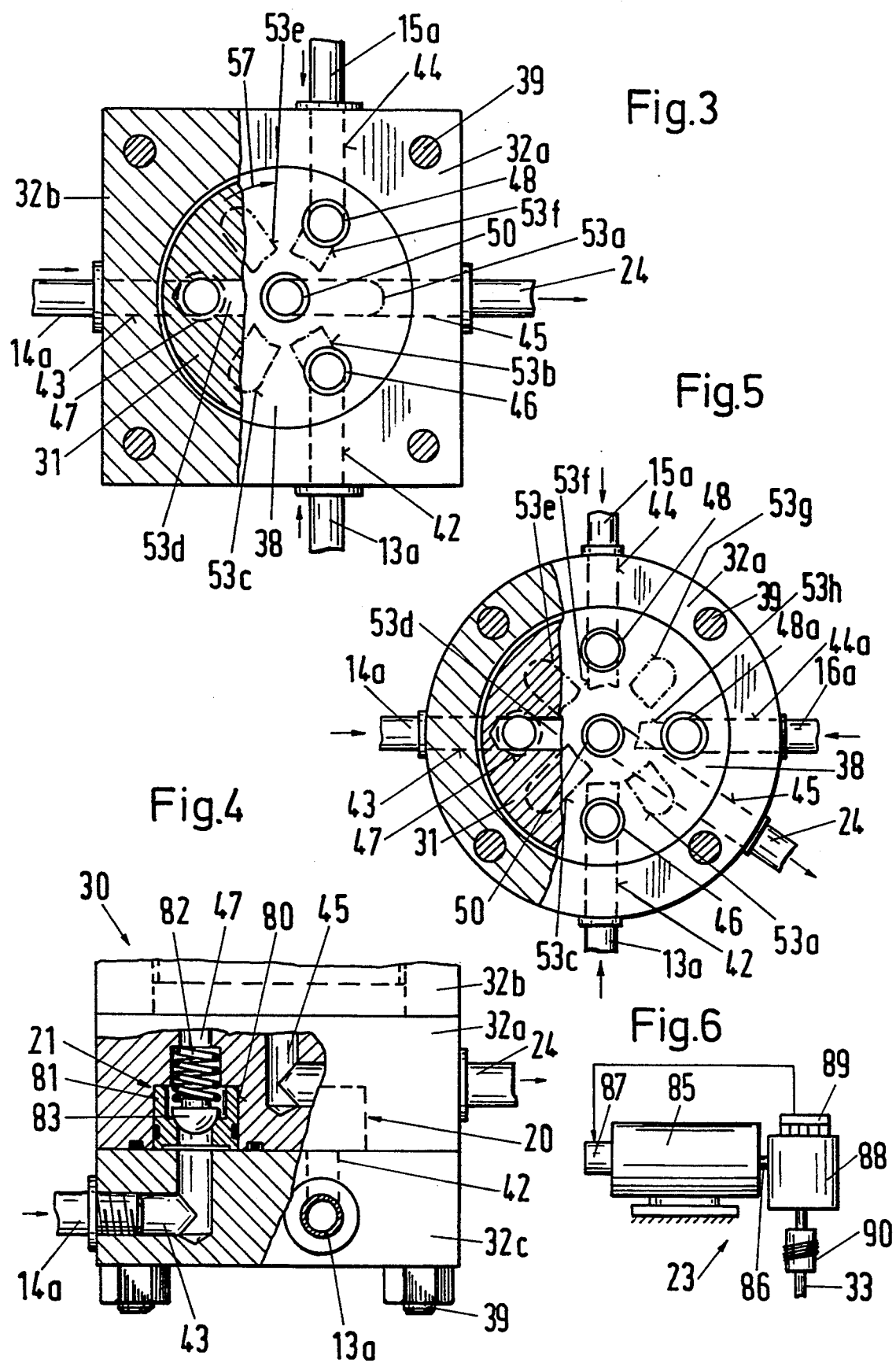

INSTALLATION FOR REFUELLING A MOBILE PRESSURE VESSEL WITH A GASEOUS FUEL AND A METHOD OF OPERATION OF AN INSTALLATION OF THAT KIND

BACKGROUND OF THE INVENTION

The invention is concerned with an installation for refuelling a mobile pressure vessel, in particular a fuel tank on a vehicle, with a gaseous fuel which in particular is natural gas, having at least two intermediate stores in which the fuel may be stored at different storage pressures, and a batching device by which a refuelling equipment which may be coupled to the pressure vessel may be connected to any one of the intermediate stores in a predetermined sequence, starting with the intermediate store which exhibits the lowest storage pressure.

The invention is further concerned with a method of operation of an installation of that kind.

An installation of the aforesaid kind, known from the SULZER-BURCKHARDT publication: "Factors influencing the use of CNG as an automotive fuel", 1986, contains three groups of intermediate stores fed by a high-pressure compressor connected to a natural gas main, the natural gas being compressed into the intermediate stores of all three groups at a storage pressure of, e.g., 250 bar. The intermediate storage groups are respectively connected to the refuelling equipment according to a predetermined sequence of priorities so that the storage pressures of the individual groups decrease at different rates. The batching device of the known installation contains three electromagnetic control valves which may be energized via a processor, and via which the intermediate storage groups may be connected one at a time to the refuelling equipment. At the start of a process of refuelling, the first control valve which is opened first of all by the processor is that which is associated with the group of intermediate stores at the lowest storage pressure. When the same pressure prevails in the pressure vessel being refuelled and in the intermediate stores of this first group the first control valve is closed and the second control valve associated with the group of intermediate stores at the middle storage pressure is opened. When the pressure which prevails in the pressure vessel is the same as in the intermediate stores of this second group, the second control valve is closed and the third control valve is opened which is associated with the group of intermediate stores at the highest storage pressure. When a predetermined refuelling pressure is reached in the pressure vessel the third control valve is closed and the refuelling process is terminated. The electromagnetic control valves of the known batching device, which have to be designed for high pressure and energized each on its own, demand a relatively elaborate multiple control arrangement. In addition, at low ambient temperatures as well as through moisture the operability of control valves of that kind may become impaired.

SUMMARY OF THE INVENTION

The problem underlying the invention is to create an installation which in particular is further developed in this regard, with a simplified batching device of a robust compact construction which demands a low outlay on maintenance and also under unfavorable ambient influences guarantees high readiness for operation and rapid refuelling of the mobile pressure vessel.

The installation developed in accordance with the invention makes short refuelling times possible and allows direct control of the refuelling process according to a cyclic loading program which is always the same, through simple means which are distinguished by low susceptibility to trouble.

Through the method in accordance with the invention it is ensured that after each refuelling process the batching device is restored into the first blocking position which corresponds with the starting position directly provided for the next refuelling process.

BRIEF DESCRIPTION OF THE DRAWINGS

Further details follow from the description below of embodiments of the invention represented diagrammatically in the drawing, in combination with the claims. In the drawing there is shown in:

FIG. 3 is a sectional view taken along line III—III of FIG. 2;

FIG. 4 is a detail of an installation developed in accordance with the invention in a modified embodiment, in a partially sectioned elevation similar to FIG. 2;

FIG. 5 is a detail of an installation developed in accordance with the invention in a modified embodiment, in a view corresponding with FIG. 3; and FIG. 6 is a further detail of the installation developed in accordance with the invention in a modified embodiment.

DESCRIPTION OF THE PREFERRED EMBODIMENTS

Figure 1:
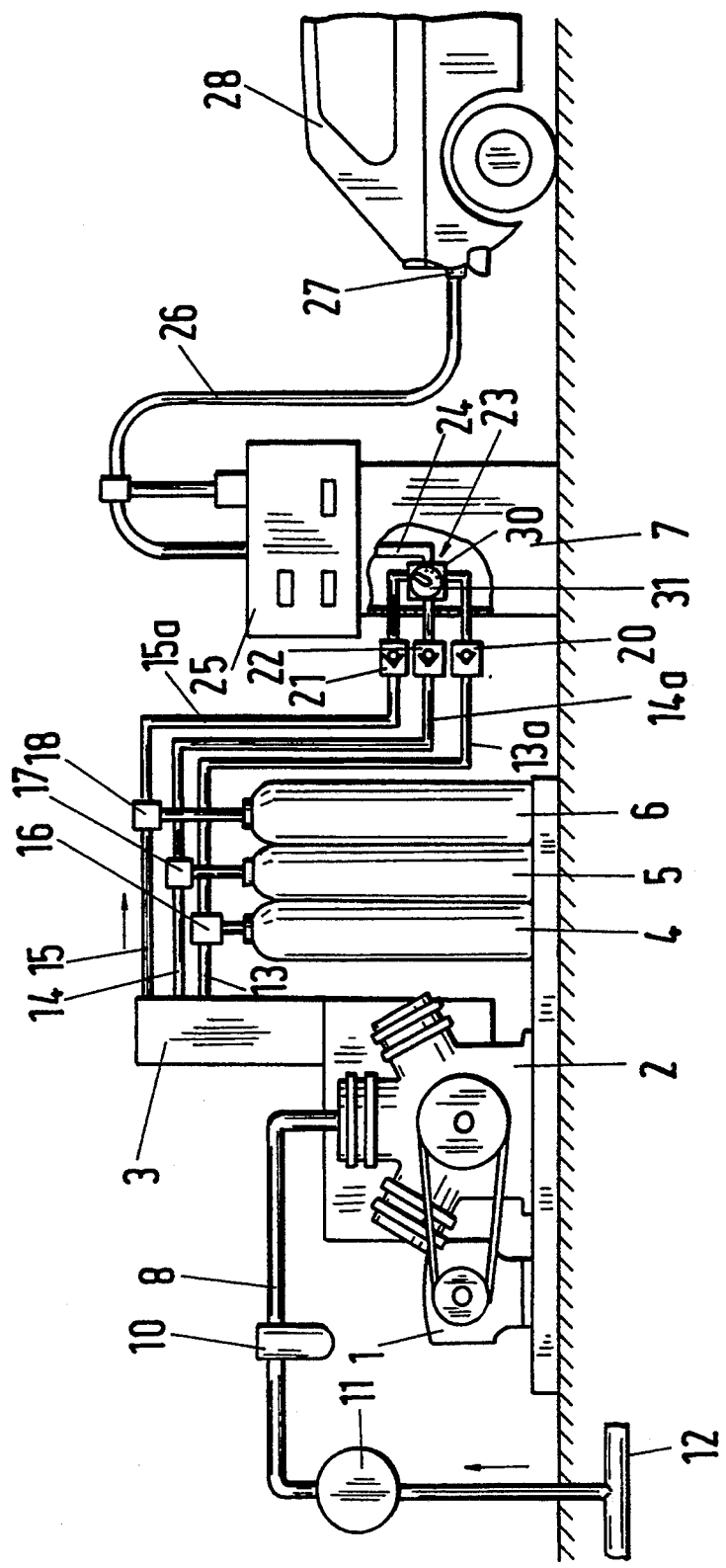
FIG. 1 shows an installation made in accordance with the invention for refuelling a motor vehicle.

The installation according to FIG. 1 contains a high-pressure compressor 2 which may be driven by a motor 1, a distributor unit 3 and a number of intermediate stores 4, 5 and 6 as well as a refuelling equipment 7. The compressor 2, which may be of any kind of construction, is connected on the suction side via a suction main 8 containing a suction filter 10 and a gas meter 11 to a source of gaseous fuel, which in the example shown is a natural gas main 12. The pressure side of the compressor is connected by a connection, which is not shown, to the distributor unit 3 which is connected via supply lines 13, 14 and 15 and valves 16, 17 and 18 to the respective intermediate stores 4, 5 and 6. In deviation from the simplified representation according to FIG. 1, each supply line 14, 15 and 16 may also be connected to one group of a number, e.g., 10 to 20, of intermediate stores 4, 5 and 6 respectively, connected in parallel with one another. In accordance with FIG. 1 the intermediate stores 4, 5 and 6—or groups of intermediate stores to correspond—are connected via the valves 16, 17 and 18, which may be set at different outlet pressures, to feed-lines 13a, 14a and 15a, each of which is provided with a non-return valve 20, 21 and 22 respectively and connected to a batching device 23 arranged in the refuelling equipment 7. Via an outlet line 24 and a flowmeter (not shown) from which the indication may be transferred to an indicator panel 25, the batching device 23 is connected to a refuelling hose 26 which may be coupled via a connector piece 27 to a filler junction on a fuel tank on a motor vehicle 28.

The natural gas which is supplied through the natural gas main 12 and as a rule exhibits a pressure of, e.g., 20 mbar, is fed by the compressor 2—operated continuously or intermittently, e.g., by means of off-peak current—via the distributor unit 3 to the intermediate stores 4, 5 and 6—or corresponding groups of intermediate stores—and compressed to a storage pressure of, e.g., 250 bar, which decreases in the intermediate stores 4, 5 and 6 at different rates during the refuelling processes. Through the valves 16 and 17 the storage pressures in the intermediate stores 4 and 5 are reduced to respective values of about 150 and 180 bar. At the start of a refuelling process, first of all the feedline 13a connected to the intermediate store 4 at the lowest storage pressure is connected via the batching device 23 to the outlet line 24. After a refuelling pressure has been reached in the pressure vessel on the motor vehicle 28 to correspond with this storage pressure, the feedline 14a connected to the intermediate store 5 is connected to the outlet line 24 and in a corresponding manner after a refuelling pressure has been reached which corresponds with the middle storage pressure, the feedline 15a connected to the intermediate store 6 is connected to the outlet line 24. After a refuelling pressure has been reached which corresponds with the highest storage pressure or some other predetermined maximum value, or because of a switching signal from a device monitoring the refuelling process, triggered in some other way, e.g., in dependence upon the amount of gas drawn in, the connection between the feedline 15a and the outlet line 24 may be interrupted and the refuelling process terminated. It goes without saying that the connection between one of the feedlines 14a, 15a or 16a and the outlet line 24 may also be interrupted at any other time and the refuelling process terminated accordingly.

Figure 2:
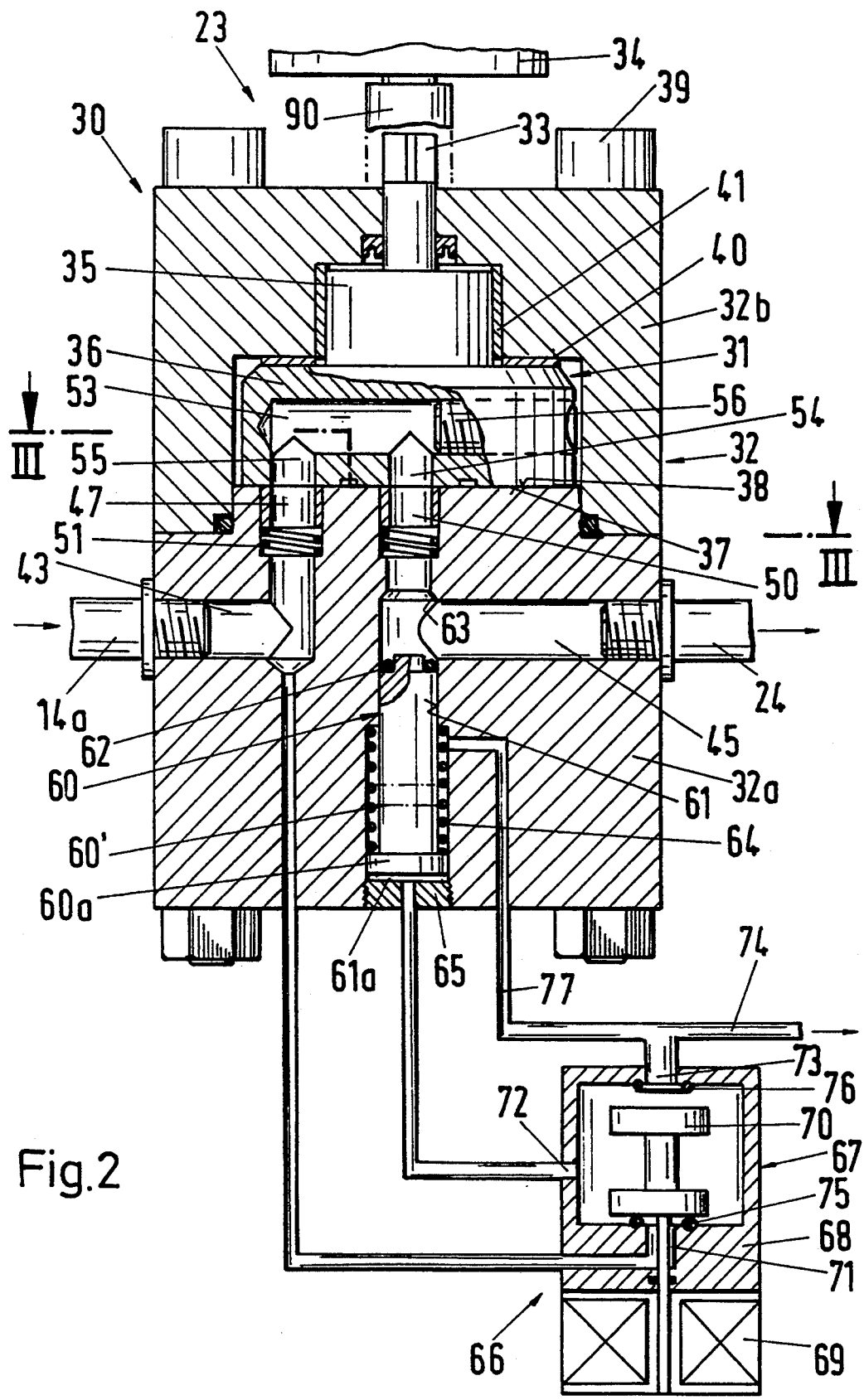
FIG. 2 is a detail of the installation in accordance with FIG. 1 in longitudinal section.

The batching device 23, which in FIGS. 2 and 3 is represented on a larger scale, contains a loading valve 30 having a valve body 31 which is arranged in a housing 32 sealed against the surroundings and may be coupled via a shaft 33 to a driving equipment 34, e.g., a stepping motor. The housing 32 exhibits two part-housings 32a and 32b which are connected together in a seal by means of bolts 39. The valve body 31 contains a swivel-piece which may be swivelled by the shaft 33, in the form of a turnable disc 36 which is provided with a cylindrical extension 35 and bears via a continuous annular running face 37 against a seat area 38 formed on the part 32a of the housing and is supported to be able to rotate continuously in a recess made in the other part 32b of the housing via a bearing arrangement 40, 41, which absorbs axial and radial forces.

The housing part 32a is made as a distributor block which exhibits three inlets 42, 43 and 44 respectively, each connected to one of the feedlines 13a, 14a and 15a, and an outlet 45 connected to the outlet line 24. In the seat area 35 of the part-housing 32a there are provided three peripheral pressure connections 46, 47 and 48 arranged offset with respect to one another along a circle and each connected to one of the inlets 42, 43 and 44, and a pressure connection 50 arranged centrally and connected to the outlet 45. Each of the pressure connections 46, 47, 48 and 50 is made in the form of a sealing ring which is arranged in a bore in the part 32a of the housing and under the action of a spring member 51 rests in a seal against the running face 37 of the turnable disc 36. The turnable disc 36 is made with a closed radial connecting channel 53 which connects a central connecting bore 54 in line with the pressure connection 50, to a peripheral transfer bore 55 arranged on the radius of the pressure connections 46, 47 and 48. In accordance with the illustration the connecting channel 53 may be formed by a bore which may be closed by means of a screw 56.

In the part-housing 32a a second valve body 60 is further arranged, which is made in the form of a piston and guided to make a seal in a bore 61 connected to the outlet 45. The valve body 60 is adjustable between an open position exposing the outlet 45 as represented in FIG. 2 and a blocking position 60' which blocks the connection between the central pressure connection 50 and the outlet 45 and in which the valve body 60 rests by a sealing ring 62 arranged on its head portion, against a valve seat 63 in the bore 61 formed between the pressure connection 50 and the outlet 45. Under the action of a spring 64 the valve body 60 is held tightly against a closure part 65 which may be screwed into the bore 61 and defines, with an end portion 60a facing it on the valve body 60 and guided to make a seal in the bore 61, a cylindrical space 61a.

For actuation of the second valve body 60 a positioning mechanism 66 actuatable independently of the driving mechanism 34 of the loading valve 30 is provided and contains a control valve 67 with a valve housing 68 and a third valve body 70 movable by a core of an electromagnet 69. The housing 68 of the valve is made with an inlet 71, a first outlet 72 and a second outlet 73. The inlet 71 is associated with a piston area of the valve body 70 next to the electromagnet 69 and connected to one of the inlets 42, 43 or 44 respectively of the loading valve 30, viz. the inlet 43 in accordance with the illustration. The first outlet 72 is connected to the cylindrical space 61a, while the second outlet 73 is associated with a piston area of the valve body 70 remote from the electromagnet 69 and is connected to a discharge line 74 leading away from the refuelling installation. In accordance with the illustration a ventline 77 may be connected to the discharge line 74 and connected to the portion of the bore 61 containing the spring 64. The outlets 71 and 73 are surrounded by respective sealing rings 75 and 76.

In FIG. 3 five angular positions shown by dash-dot lines and one angular position 53d shown by solid lines are indicated for the connecting channel 53 in the turnable disc 36, of which the angular positions 53a, 53c and 53e correspond with respective first, second and third blocking positions of the valve body 31 of the loading valve 30, in which the peripheral pressure connections 46, 47 and 48 are blocked. The angular positions 53b, 53d and 53f correspond with respective first, second and third flow positions of the valve body 31, in which respectively one of the pressure connections 46, 47 and 48 is connected to the central pressure connection 50.

At the start of a refuelling process lasting, e.g., three minutes, the valve body 31 is swivelled in accordance with the arrow 57 from the first blocking position reached during the preceding refuelling process and corresponding with the angular position 53a, into the first flow position associated with the inlet 42, and upon the refuelling pressure corresponding with the storage pressure of the intermediate store 4 being reached, is swivelled past the second blocking position corresponding with the angular position 53c into the second flow position associated with the inlet 43. Hereupon in a corresponding way the valve body 31 is swivelled past the third blocking position corresponding with the angular position 53e into the third flow position associated with the inlet 44 and finally upon the predetermined maximum refuelling pressure being reached is swivelled in the same direction of rotation back into the first blocking position corresponding with the angular position 53a.

Upon swivelling the valve body 31 into or respectively out of one of the flow positions, because of the increasing or respectively decreasing overlap of the cross-sections of the transfer bore 55 of the valve body 31 and of the pressure connection concerned, through which flow is possible, a correspondingly proportionable release or throttling of the flow may be achieved.

According to the representation according to FIG. 2, during the refuelling process the second valve body 60 is held in the open position and the valve body 70 of the control valve 67 is pressed by the electromagnet 69, which is excited under normal operating conditions, against the pressure prevailing in the inlet 71 from the gas flowing through the loading valve 30, into the lift position shown, closing off the inlet 71 against the sealing ring 75. In the event of a power failure the valve body 70 is released and through the gas flowing through the inlet 71 is moved into a lift position closing off the second outlet 73 and pressed against the sealing ring 76. To correspond, the cylindrical space 61a connected to the housing 78 is acted upon by the gas via the first outlet 72 so that the valve body 60 is moved from the open position shown into the blocking position 60' indicated by dash-dot lines and held in this position, blocking the outlet 45. When the power failure is removed, through the electromagnet 69 being correspondingly excited again, the valve body 70 of the control valve 67 is moved back into the lift position shown, the inlet 71 is closed, and the gas present in the housing 68 and in the cylindrical space 61a is led away via the outlet 73 into the discharge line 74 and the valve body 60 is returned into the open position shown which allows the continuation of the refuelling process interrupted by the power failure. Through the arrangement described it is ensured that in the case of a power failure the refuelling process is interrupted and an uncontrolled feed of gas through the loading valve 30 is prevented.

As is seen in FIG. 4 the non-return valves 20, 21 and 22 associated with the feedlines 13a, 14a and 15a may also be arranged in the housing 31 of the loading valve 30. In the embodiment shown the non-return valves are arranged in the bores 80 in the part 32a of the housing, which are connected to the pressure connections 46, 47 and 48, while the inlets 42, 43 and 44 are made in a third part 32c of the housing connected detachably to the part 32a of the housing. The non-return valves 20, 21 and 22, which may be of any kind of construction, exhibit in the representation according to FIG. 4 in each case a bush 81 arranged to seal the bore 80 in question and provided with a valve seat, and a spherical valve body 83 loaded by a spring 82. The execution described enables a compact construction of the batching device, which is closed off against the surroundings and may be built in and taken out as a coherent component with correspondingly little effort in mounting and demands little effort in maintenance.

Instead of the executions having three inlets as described above, a loading valve 30 with two inlets is also possible, or as shown in FIG. 5 with four inlets 42, 43, 44 and 44a, each of which may be connected to one intermediate store or one group of intermediate stores, with four pressure connections 46, 47, 48 and 48a respectively provided to correspond and the valve body 31 being adjustable between four blocking positions corresponding with the angular positions 53a, 53c, 53e and 53g, and four flow positions. Executions having a larger number of inlets are also possible, in which case the distances between the peripheral pressure connections must in each case be at least equal to the diameter of the transfer bore formed in the turnable disc in order to ensure that during cyclic adjustment of the valve body a blocking position follows every flow position.

In accordance with FIG. 6 the driving mechanism 23 of the loading valve 30 may contain an asynchronous motor 85 which may be coupled via a reducing gear 88, e.g., a worm gear, and a coupling 90 stiff in rotation, to the driving shaft 33 of the valve body 31. In accordance with the illustration the asynchronous motor 85 may be provided with a brake 87 which acts upon its shaft 86 and is actuable in dependence upon an angle-encoder 89 which detects the angular position of the driving shaft 33, whereby exact positioning of the valve body 31 may be achieved at any time. This execution represents a cheaper variant upon an execution with a stepping-motor and yields a driving mechanism of simple construction. One advantage of the asynchronous motor 85 employed consists in being able to connect it directly to the a.c. mains.

What is claimed is:

1. In an installation for refuelling a mobile pressure vessel with a gaseous fuel having at least two intermediate stores in which the fuel may be stored at different storage pressures, and a batching device for coupling a refuelling equipment to any one of the intermediate stores in a predetermined sequence, starting with an intermediate store which exhibits the lowest storage pressure, the improvement comprising a loading valve connected with the batching device which includes a housing sealed against the surroundings and has at least two inlets, each connected to one of the intermediate stores, and one outlet connected to the refuelling equipment, a valve body which is adjustable cyclically by a driving mechanism and may be indexed from time to time in a certain direction of rotation past a first blocking position which closes off the inlets into a first position of flow which is associated with the intermediate store at the lowest storage pressure and allows a connection between the corresponding inlet and the outlet, and in the same direction of rotation from time to time past a further blocking position into a further position of flow which is associated with the intermediate store at the next higher storage pressure, and in the same direction of rotation from the position of flow associated with the intermediate store at the highest storage pressure into the first blocking position.

2. An installation as in claim 1, wherein the loading valve includes as the valve body a swivel-piece which is supported in the housing so as to be able to swivel about an axis of rotation and be actuated from outside and has the form of a continuously turnable disc which presents a continuous annular running-surface to peripheral pressure connections arranged about a circle in the housing, each being associated with one of the inlets and resting against said running-surface so as to form a seal, and which is made with a closed tie-channel which connects a takeover bore formed in the running face so as to lie on the radius of the pressure connections, to a connector bore formed in a region of the axis of rotation, and which, in dependence on the angular position of the turnable disc, connects one of the peripheral pressure connections to a central pressure connection which is arranged in the housing and associated with the outlet from the loading valve and rests against the turnable disc in the region of the axis of rotation so as to form a seal.

3. An installation as in claim 2, wherein the spaces between the peripheral pressure connections are at least equal to the diameter of the takeover bore formed in the turnable disc.

4. An installation as in claim 1, wherein the driving mechanism of the loading valve includes an asynchronous motor which is provided with a brake acting on its shaft and is coupled via a gear and a torsionally stiff coupling to a driving shaft of the valve body.

5. An installation as in claim 1, wherein the batching device includes a second valve body associated with the outlet from the loading valve and adjustable With a positioning mechanism which is independent of the driving mechanism of the cyclically adjustable first valve body, between an open position which exposes the outlet and a blocking position which blocks the outlet.

6. An installation as in claim 5, wherein the second valve body is constructed in the form of a piston which is guided to form a seal in a bore connected to the outlet from the housing of the loading valve and is adjustable between a first stroke position corresponding to its flow position and a second stroke position corresponding to its blocking position and in which it rests against a valve seat formed in the bore.

7. An installation as in claim 6, wherein the mechanism for positioning the second valve body includes a control valve which has a valve housing and a third valve body which is movable in the latter by a core of an electromagnet, the valve housing of the control valve having one inlet connected to one of the inlets of the loading valve, a first outlet connected to the bore containing the second valve body in the loading valve and a second outlet connected to a discharge line, and wherein the third valve body is movable between a first stroke position when the electromagnet is energized to close off the inlet to the control valve, and a second stroke position when the electromagnet is not energized to expose said inlet and in which, under the influence of the storage pressure prevailing in the inlet to the loading valve, the third valve body closes off the second outlet from the control valve, the second valve body of the loading valve being adapted to be acted upon via the first outlet from the control valve by the storage pressure prevailing in the inlet to the loading valve and moved against the associated valve seat.

8. An installation as in claim 1, including non-return valves associated with the respective inlets to the loading valve and arranged between the intermediate stores and the batching device, the non-return valves being arranged in the housing of the loading valve.

9. A method of operating an installation as in claim 1 comprising the steps of upon starting a refuelling process from time to time indexing the valve body of the loading valve with the driving mechanism in the predetermined direction of rotation from the first blocking position into the first flow position associated with the intermediate store at the lowest storage pressure, after reaching a loading pressure in at least one of the mobile pressure vessel and the refuelling equipment corresponding to the storage pressure of the intermediate store connected at the time, and less than a predetermined value of the loading pressure, indexing the valve body in the same direction of rotation past at least one further blocking position into the flow position associated with the intermediate store at the next higher storage pressure, and, upon reaching the predetermined value of the loading pressure, indexing the valve body in the same direction of rotation from the flow position associated with the respective intermediate store into the first blocking position.

* * * * *